United States Patent [19]

Ramsden

[11] Patent Number: 5,793,864
[45] Date of Patent: Aug. 11, 1998

[54] NONINTRUSIVE MEASUREMENT OF ECHO POWER AND ECHO PATH DELAY PRESENT ON A TRANSMISSION PATH

[75] Inventor: David Beaumont Ramsden, Wall, N.J.

[73] Assignee: AT&T Corp., Middletown, N.J.

[21] Appl. No.: 771,825

[22] Filed: Dec. 12, 1996

[51] Int. Cl.⁶ .............................. H04M 9/00; H04M 3/32
[52] U.S. Cl. .......................... 379/410; 379/24; 379/406; 704/227
[58] Field of Search ............................... 379/410, 411, 379/412, 406, 407, 24, 416; 370/268, 435; 704/227

[56] References Cited

U.S. PATENT DOCUMENTS

| | | | |
|---|---|---|---|
| 4,363,938 | 12/1982 | Daaboul et al. | 379/24 |
| 4,408,324 | 10/1983 | Black et al. | 370/435 |
| 4,535,445 | 8/1985 | Lane et al. | 370/268 |
| 4,552,996 | 11/1985 | De Bergh | 379/24 |
| 4,645,883 | 2/1987 | Horna et al. | 379/406 |
| 4,947,425 | 8/1990 | Grizmala et al. | 379/410 |
| 5,216,702 | 6/1993 | Ramsden | 379/24 |
| 5,572,621 | 11/1996 | Martin | 704/227 |
| 5,625,687 | 4/1997 | Sayre, III | 379/416 |
| 5,657,401 | 8/1997 | De Haan et al. | 382/275 |

OTHER PUBLICATIONS

Earl R. Ferrara, Jr., *Frequency–Domain Adaptive Filtering*, in Adaptive Filters 145 (C.F.N. Cowan and P.M. Grant eds., 1985).

Harish S. Punjabi et al., *A Modified μ–Weighted Normalized Frequency–Domain LMS Algorithm*, Globecom, 1994, pp. 232–236.

Bernard Widrow, et al., *Adaptive Signal Processing*, ch. 6, pp. 99–114 (1985).

Members of Technical Staff of Bell Telephone Laboratories, *Transmission Systems for Communications*, ch. 35.2 (5th Ed. 1982).

*Primary Examiner*—Krista Zele
*Assistant Examiner*—Jacques M. Saint-Surin

[57] ABSTRACT

A method for providing an echo power measurement of a transmission line having an echo path delay wherein a frequency domain adaptive filter is converged using samples collected from the transmission line that have been converted from a time domain to a frequency domain. A regression method is used to estimate the magnitude of taps of the frequency bins of the frequency domain adaptive filter that have been determined to be not accurately converged. In addition, a method and apparatus for measuring the echo path delay of a transmission line wherein a predetermined number of first time domain adaptive filters covering predetermined time periods are converged using samples collected from the transmission line that have been subband filtered to calculate a rough estimate of the echo path delay. Then, a second time domain adaptive filter is converged using the non-filtered samples to calculate a final echo path delay.

42 Claims, 7 Drawing Sheets

NONINTRUSIVE MEASUREMENT OF ECHO POWER AND ECHO PATH DELAY PRESENT ON A TRANSMISSION PATH

FIELD OF THE INVENTION

This invention relates to a nonintrusive method for measuring the echo path delay and the power of an echo present on a transmission path.

BACKGROUND OF THE INVENTION

In a conventional telephone circuit, a two-wire telephone line of a local subscriber loop must be converted to a four-wire telephone line for transmission over longer distances. This conversion is typically performed by hybrid circuits that couple the two-wire line to the four-wire line. Often times it is not possible to accurately match the impedance of the two-wire line to the hybrid. Such an impedance mismatch often causes transmitted signals to be coupled into the return path and fed back to their respective sources, a phenomenon commonly known as an echo.

A so called near-end echo refers to an echo caused by the reflection of a transmitted signal at the point where the two-wire line of a sending party's telephone is converted to a four-wire line. A so called far-end echo refers to an echo caused by the reflection of the same transmitted signal back to the sending party at the point where the four-wire line is converted back into the two-wire line of a receiving party's telephone.

Echo power measurements such as echo path loss measure the magnitude of the energy returned as an echo relative to the magnitude of the energy of the originally transmitted signal. Echo path delay is a measurement of the delay between the time at which the initially transmitted signal is received and the time at which the echo is received. The degree of annoyance due to an echo experienced by a talker is a factor of both the echo power and echo path delay of the transmission path. Thus, it is important to be able to measure the echo power and echo path delay of a transmission path and thereby identify locations on the transmission path that have echo path problems, i.e., locations where the echo path loss is too large, the echo path delay is too long, or both.

U.S. Pat. No. 4,947,425 to Grizmala et al. describes an echo measurement arrangement which separates and measures the magnitude of near-end and far-end echoes by adaptively converging on each echo beginning with the near-end echo using a time domain adaptive filter. The convergence error in the estimate of the echo obtained at each sample in the adaptive procedure is recorded. When the filter converges on an echo, as indicated by a minimum mean-square error value, the magnitude of the echo is measured and its propagation delay is calculated using the number of sampling intervals required to position the adaptive filter on the dispersion of that echo.

The echo measuring arrangement of the Grizmala et al. patent is designed to function at a two-wire point of the telephone circuit. Furthermore, the method employed by the arrangement of the Grizmala et al. patent is intrusive, meaning that a noise signal is introduced into the telephone circuit for purposes of measuring the echo path loss and echo path delay of echoes present in the circuit.

SUMMARY OF THE INVENTION

A method for measuring an echo power of a transmission line having an echo path delay wherein, as a first step, a predetermined number of consecutive samples of a speech signal that is being transmitted on the transmission line and a predetermined number of consecutive samples of a signal that is simultaneously being received on the transmission line are collected. Next, the speech signal samples and the received signal samples are converted from a time domain to a frequency domain. Then, a frequency domain adaptive filter having a predetermined number of frequency bins having taps is converged using predetermined ranges of the converted speech signal samples and corresponding ones of the converted received signal samples, the corresponding ones of the converted received signal samples being delayed in time by a value equal to the echo path delay. It is then determined whether a predetermined number of the frequency bins have accurately converged by determining whether the frequency bins satisfy a predetermined convergence criteria. Next, the magnitude of the taps of the frequency bins that are not determined to be accurately converged are estimated using a regression method. Finally, the echo power measurement is calculated according to a predetermined formula using the magnitude of each of the taps of the accurately converged frequency bins and the estimated magnitudes. An apparatus for practicing the above described method is also disclosed.

In addition, a method for measuring the echo path delay of a transmission line is described wherein the first step is identical to that described above. Next, the collected speech signal samples and received signal samples are subband filtered. Then, a predetermined number of time domain adaptive filters having taps are converged for a predetermined number of iterations using the subband filtered speech signal samples and corresponding ones of the subband filtered received signal samples. Each of the time domain adaptive filters cover a predetermined time period. The most accurately converged first time domain adaptive filter is then determined as measured by a predetermined criteria. Also, the tap of the most accurately converged filter having the largest power is identified, wherein the tap having the largest power corresponds to a first time value. Next, an additional time domain adaptive filter having taps is converged for a predetermined number of iterations using the collected speech signal samples and corresponding ones of the collected received signal samples, the corresponding ones of the collected received signal samples being delayed in time by the first time value. Then, the tap of the second time domain adaptive filter having the largest power is identified, wherein that tap corresponds to a second time value. Finally, the echo path delay is calculated according to a predetermined formula using the second time value. An apparatus for practicing the above described method is also described.

DETAILED DESCRIPTION OF THE PREFERRED EMBODIMENTS

Figure 1:
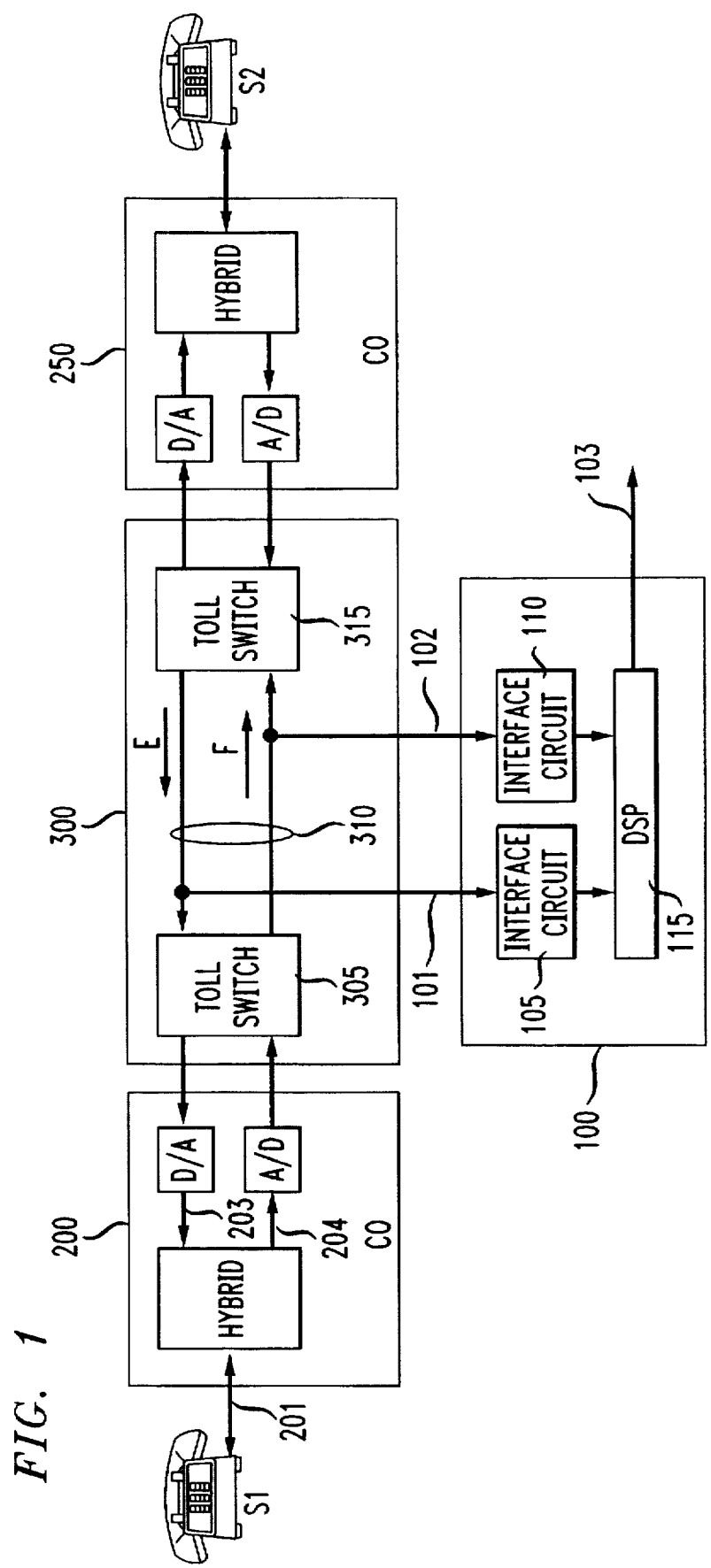
FIG. 1 is a block diagram of a conventional telephone circuit showing the signal measurement arrangement of the present invention connected to an in-service network connection.
Figure 2:
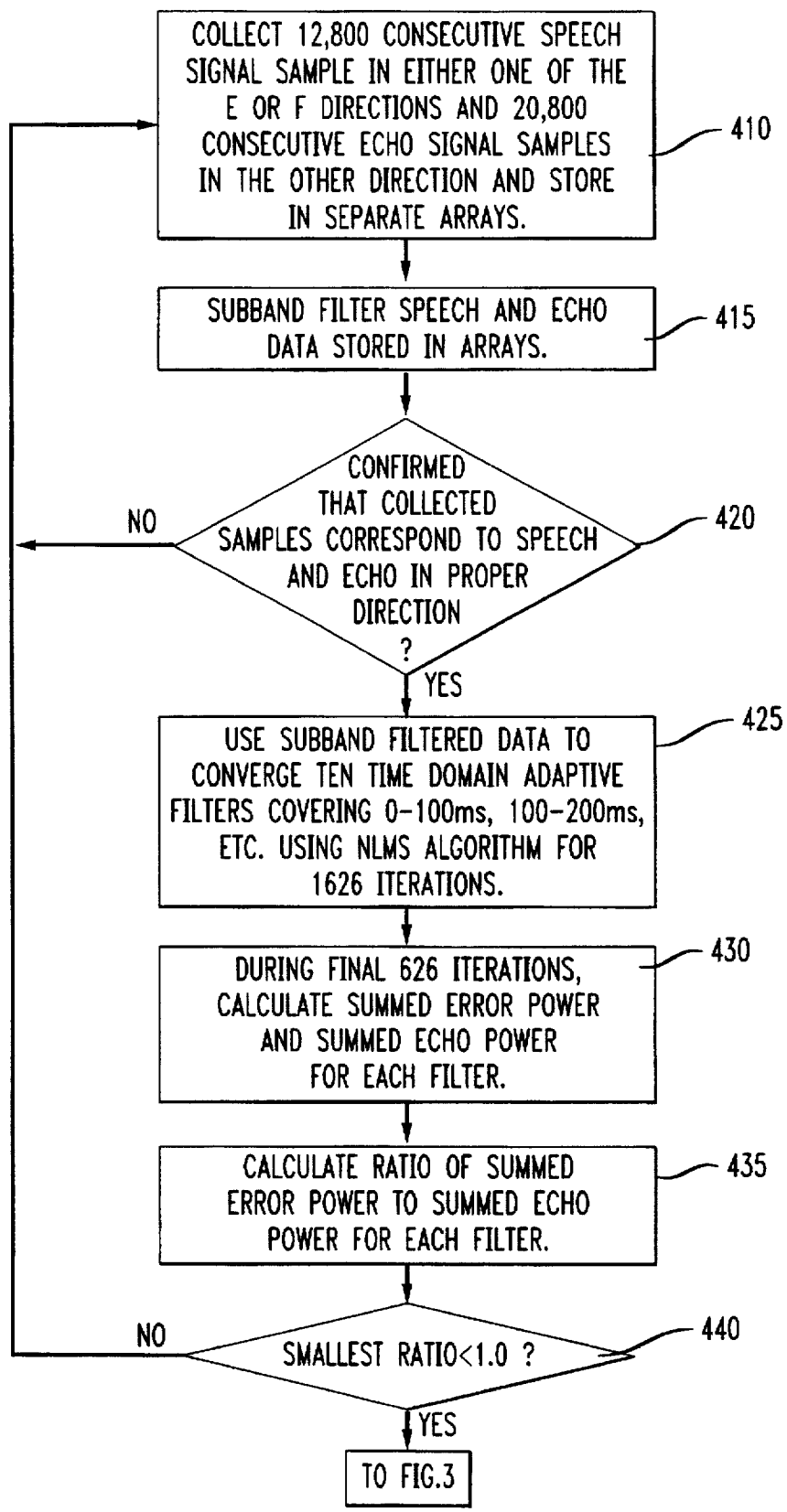
FIGS. 2–7 are a flow chart of the algorithm which implements the present invention in the digital signal processor of FIG. 1.
Figure 3:
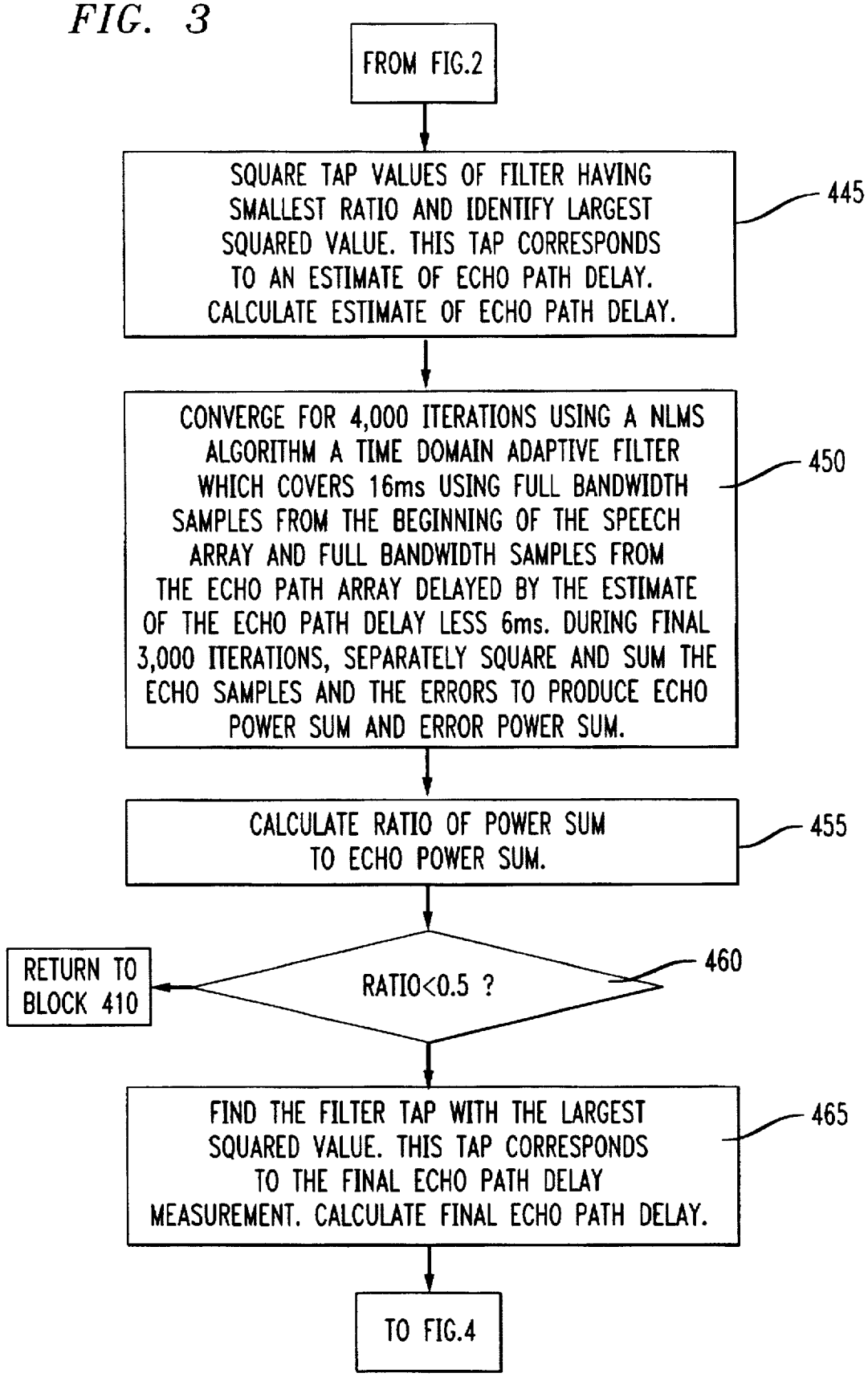
Figure 4:
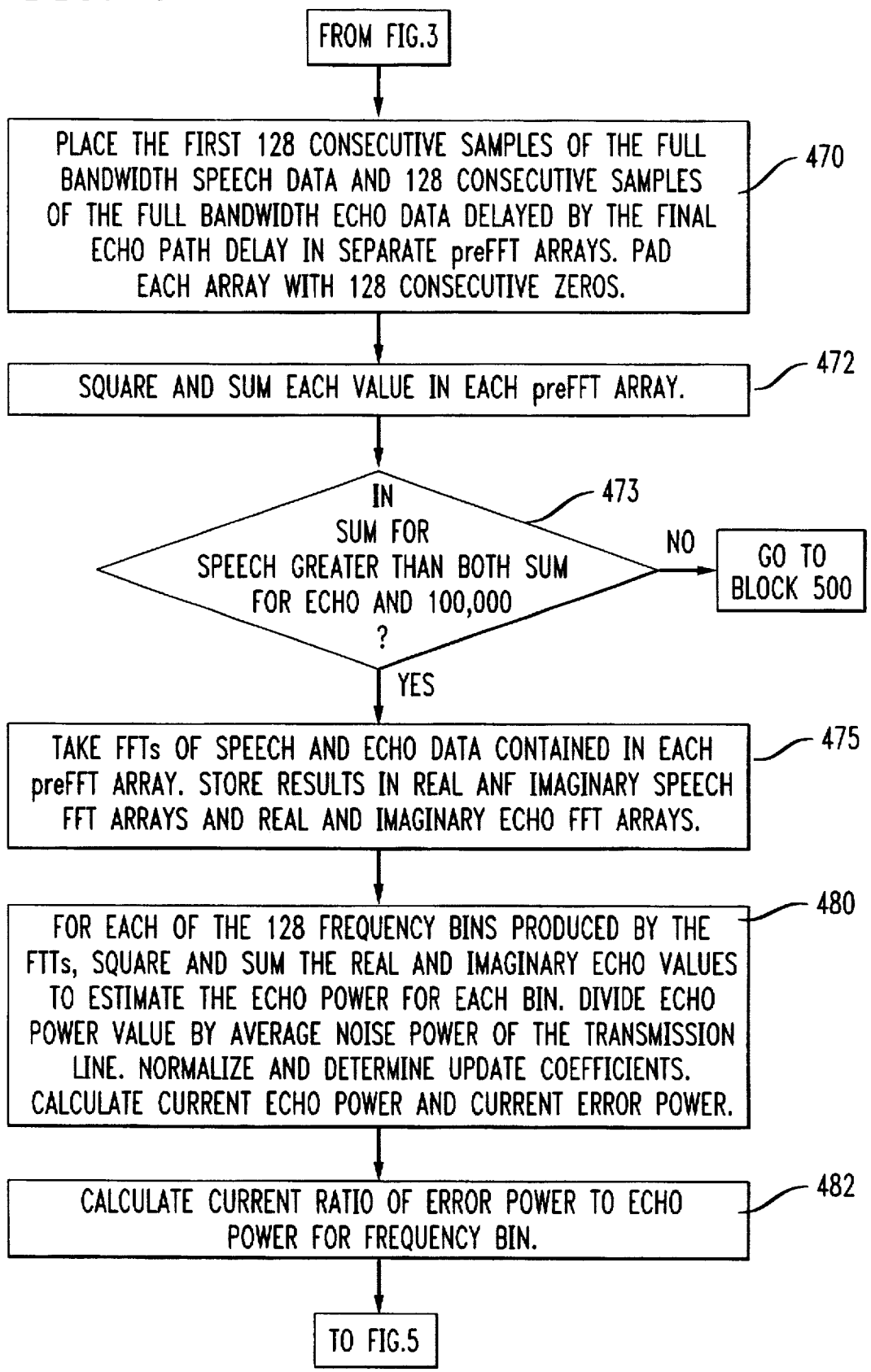
Figure 5:
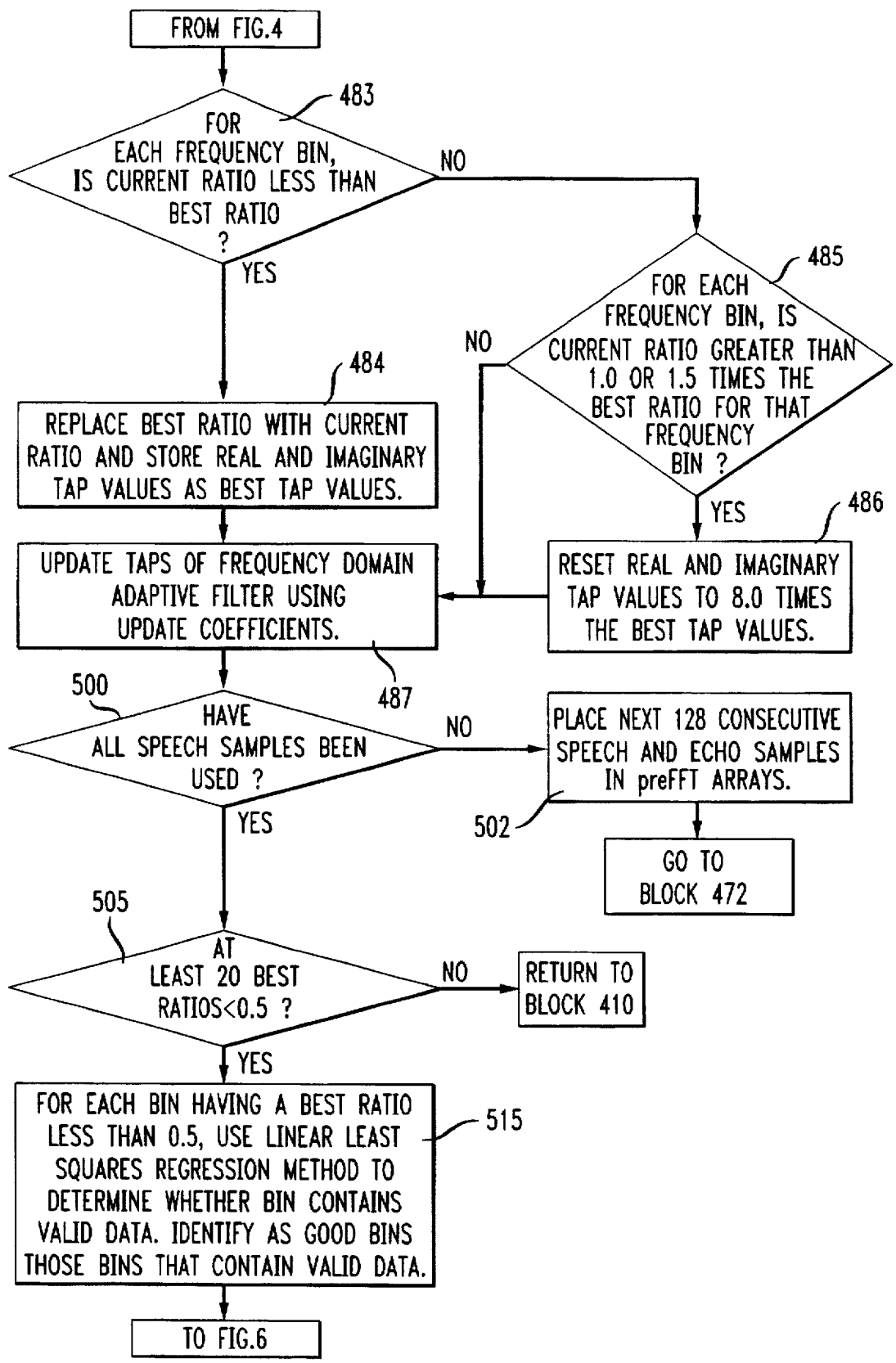
Figure 6:
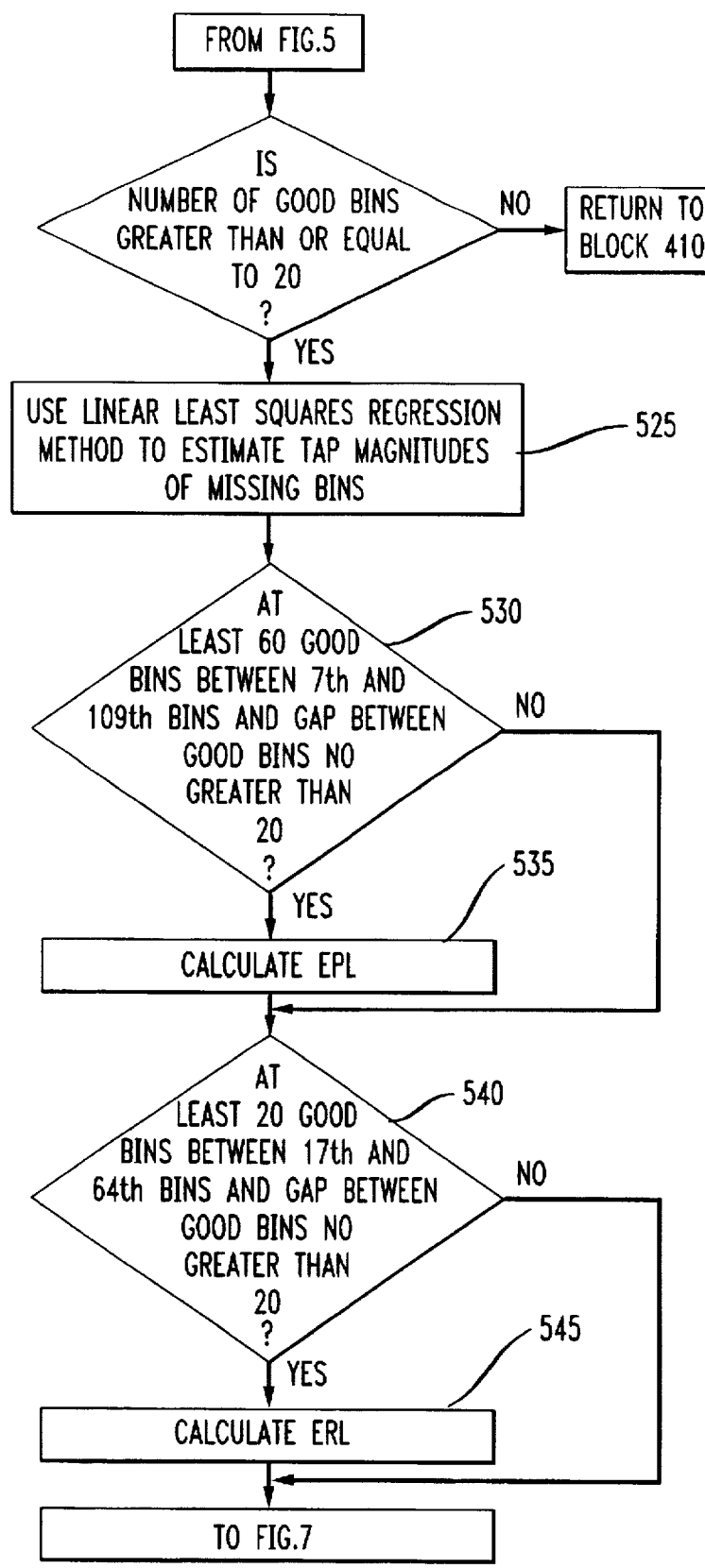
Figure 7:
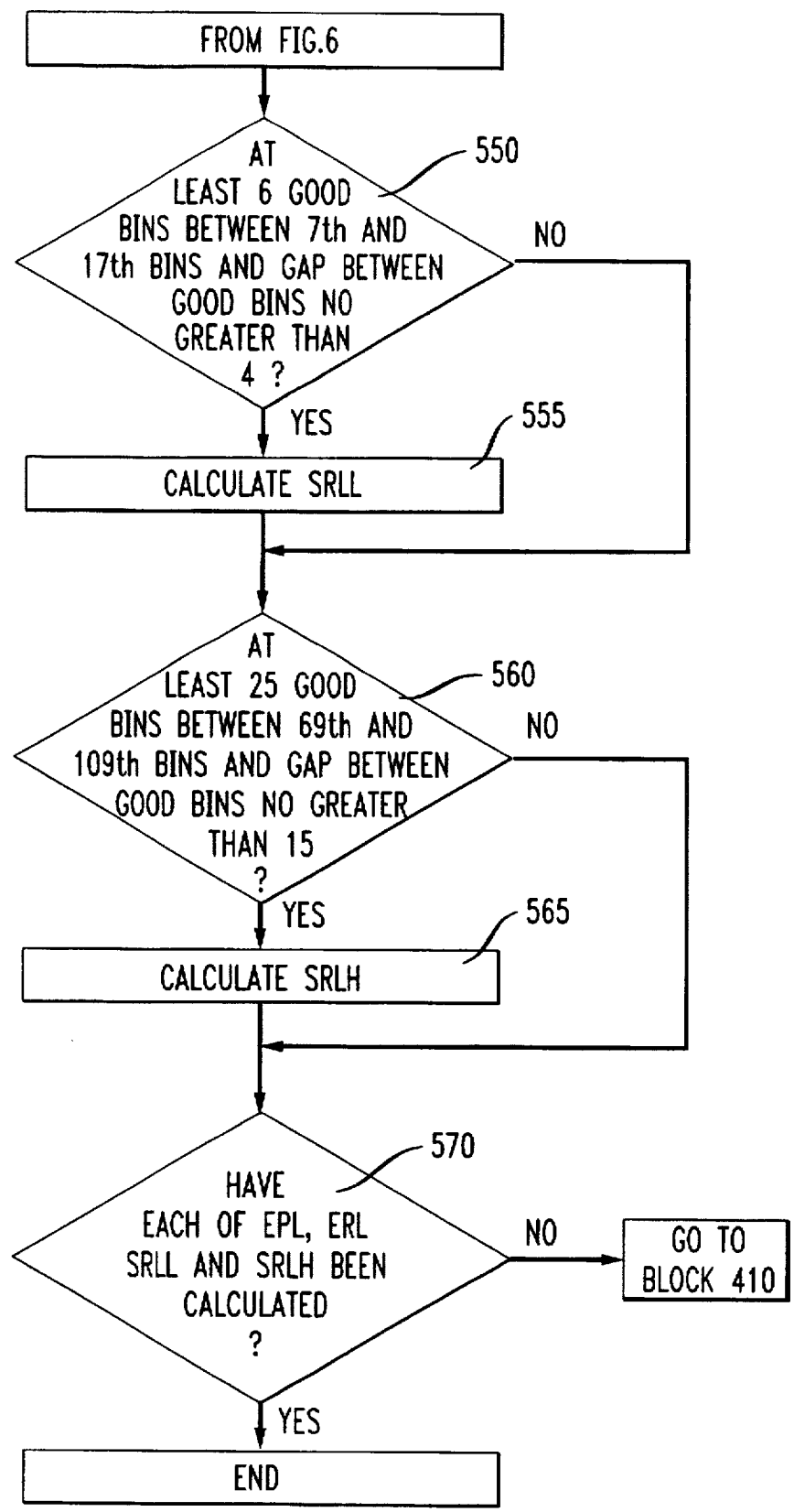

FIG. 1 illustrates a conventional telephone connection established between station sets S1 and S2 through Central Office (COs) 200 and 250 and interexchange network 300. The way in which a telephone connection is established between telephone station sets is well known and will not be discussed herein. However, it is seen from FIG. 1 that such a connection includes telephone line 201, which connects station set S1 to Central Office (CO) 200. At CO 200, a conventional hybrid arrangement converts two-wire telephone line 201 to a four-wire transmission path comprising paths 203 and 204. Paths 203 and 204 are then connected through toll switch 305, intertoll connection 310 and toll switch 315 to CO 250, where another conventional hybrid arrangement converts paths 203 and 204 into a two-wire telephone line extending to station set S2.

As is well known, interexchange network 300 may be of the type which transports speech signals through its associated intertoll network 310 in digital form. Accordingly, COs 200 and 250 include analog-to-digital and digital-to-analog converters in the interface that they present to interexchange network 300.

Samples of the digital signals traveling in the E and F directions along intertoll connection 310 are supplied to signal measurement arrangement 100 through leads 101 and 102, respectively. Digital signals appearing on leads 101 and 102 are then presented to respective inputs of Digital Signal Processor, or DSP, 115 through interface circuits 105 and 110, respectively. DSP 115 may be, for example, the model DSP32 available from AT&T.

DSP 115 is programmed with the echo path loss and echo path delay measuring algorithm of the present invention, which will be described in greater detail below. Thus, as can be seen from FIG. 1, the algorithm of the present invention is performed at a four-wire location in the middle of the interexchange network 300. Also, the algorithm is nonintrusive, meaning that it measures and analyzes actual speech and echoes that are present on the network while the network is in service. It should be noted that, because DSP 115 is located in the middle of interexchange network 300 in a preferred embodiment of the present invention, the algorithm programmed therein measures and analyzes a far-end echo. However, it should be apparent to one of ordinary skill in the art that the algorithm is able to measure with equal accuracy any echo present on a telephone network.

Referring now to FIGS. 2 through 7, an aspect of the present invention will be described in detail. First, it is necessary to obtain a predetermined amount, preferably one point six seconds worth, of speech consecutive samples in one of the E or F directions and a predetermined amount, preferably two point six seconds worth, of consecutive echo samples in the other direction. One point six seconds of speech corresponds to approximately 12,800 samples and two point six seconds of echo corresponds substantially to 20,800 samples. Approximately a second more of echo is collected because, in a preferred embodiment of the present invention, it is desired to measure up to a second of echo path delay. It should be apparent, however, to one of ordinary skill in the art that the maximum echo path delay the algorithm can measure can be varied by varying the amount of echo signal samples obtained. In addition, for the purpose of illustrating the method of the present invention, it will be assumed that 12,800 samples of speech and 20,800 samples of echo are obtained. It should be noted that these values are used only for illustrative purposes and that other sample amounts can be used without deviating from the scope of the invention.

Thus, as shown in block 410, DSP 115 samples the signals in the E and F directions and collects 12,800 consecutive speech signal samples in one direction and 20,800 consecutive echo signal samples in the other direction. As part of this process, DSP 115 analyzes each sample collected to determine whether it represents speech. Specifically, if a particular sample represents a level which equals or exceeds a predetermined threshold, for example, a threshold having a level of −42 dBm, then DSP 115 concludes that the sample represents a speech signal. Also, as shown in block 410, as the samples are being collected, they are stored at sequential locations in separate arrays. Accordingly, one of the arrays will contain speech signal samples and the other array will contain echo signal samples. If at any time during this collection process DSP 115 detects speech in the opposite or neither direction, it stops the collection, discards the data in the arrays, and starts collecting samples again from the beginning. One method of collecting consecutive speech samples in a telephone network and for determining whether a signal is speech or an echo is described in U.S. Pat. No. 5,216,702 to Ramsden, the specification of which is incorporated herein by reference.

The bandwidth of a conventional telephone network, and thus the bandwidth of the signals stored in the speech and echo arrays, is typically 0–4000 Hz. According to the Nyquist criterion, it would be necessary to have a sampling rate of 8,000 samples per second for this frequency range. In order to avoid such a large sample rate, the samples contained in the speech and echo arrays are passed through a subband filter, preferably a 500–1000 Hz subband filter, as shown in block 415. Every eighth subband filtered speech sample and every eighth subband filtered echo sample are stored in separate secondary speech and echo arrays. Thus, the secondary speech and echo arrays contain a new set of speech samples and a new set of echo samples, each with a smaller bandwidth totalling 500 Hz. Accordingly, only 1,000 samples per second are necessary under the Nyquist criterion. Note, the original unfiltered speech and echo samples remain stored in the speech and echo arrays for later use in the algorithm, as will be described below.

Next, referring to block 420, the first 525 values in the secondary speech array are squared and summed and the first 525 values in the secondary echo array are squared and summed. If the sum for the secondary speech array is not greater than the sum for the secondary echo array, the algorithm starts over at block 410. Similarly, the same calculation and determination are made for array values 526–1050 and array values 1051–1075. These steps are performed to confirm that the samples that have been collected correspond to speech and an echo in the proper direction and not double talk or an echo in the wrong direction.

Then, as shown in block 425, the subband filtered data is used to converge ten separate time domain adaptive filters each covering 100 ms windows using a time domain normalized least-mean-squares algorithm, or NLMS, according to a method such as the one described in detail in U.S. Pat. No. 4,947,425 to Grizmala et al., the specification of which is incorporated herein by reference. NLMS algorithms are well known in the art and will not be described in detail herein. The update coefficient for the NLMS algorithm is set equal to 0.002 multiplied by 1626 and then divided by the sum total of the secondary speech array sums calculated above. This step is equivalent to normalizing 0.002 by the average subband speech sample energy.

Because each 100 ms range contains 100 samples, each filter contains 100 taps. The 100 taps of each of the ten time domain adaptive filters are initially set equal to zero. The NLMS algorithm is used to converge each of the time domain adaptive filters for 1626 iterations using all of the values in the secondary speech array. The values in the secondary echo array used during the convergence process are delayed by the amount of time that the particular time domain adaptive filter is delayed. For example, the time domain adaptive filter that covers a delay of 0 to 100 ms uses the values in the secondary echo array that have the same index as the sample being used in the secondary speech array. The time domain adaptive filter covering 100 to 200 ms of delay uses values in the secondary echo array that have indexes 100 greater than the index for the value being used in the secondary speech array. Likewise, all of the other time domain adaptive filters use values in the secondary echo array whose indexes are increased by the minimum amount of delay covered by the particular time domain adaptive filter.

In short, during the convergence process, the output response of each filter obtained from a sequence of speech samples co-involved with the coefficients of the filter is processed with a corresponding sample of the echo signal to provide an error signal. The NLMS algorithm processes the error signal to generate a new set of filter coefficients which are then used to filter the next set of speech samples.

As shown in block 430, after each time domain adaptive filter has been converged for 1000 iterations, the echo sample from the secondary echo array used in subsequent iterations and the error made by the time domain adaptive filter in predicting the echo are squared and added to separate sums. These two sums, the summed error power and the summed echo power, are computed for each of the ten time domain adaptive filters over the final 626 iterations of the NLMS algorithm.

Referring to block 435, after each filter has been converged for a predetermined number of iterations, illustratively 1626, the ratio of the summed error power to the summed echo power is calculated for each filter. The filter with the smallest ratio is considered the best converged filter. As shown in block 440, if the smallest ratio is greater than or equal to a predetermined amount, preferably 1.0, the algorithm returns to the initial sample step of block 410 and starts over. Such a condition indicates poor convergence and that no echo was found. If, however, the smallest ratio is less than the predetermined amount, the algorithm proceeds to block 445 where the taps of the filter having the smallest ratio are squared and the largest squared value is identified, thereby identifying the tap of the filter having the greatest power. This tap corresponds to an estimate of the echo path delay. The index of this tap is added to the minimum delay covered by the filter to produce the echo path delay estimate. For example, if the fourth filter (covering 300 to 400 ms) has the minimum ratio as calculated in block 435 and its eleventh tap is the most powerful, then the rough estimate of the echo path delay is 311 ms.

Next, as shown in block 450, the calculated estimate of the echo path delay is used to converge another time domain adaptive filter covering 16 ms which uses the original unfiltered speech and echo samples stored in the speech and echo arrays. This filter uses samples from the beginning of the speech array and samples from the echo array delayed by the estimate of the echo path delay less 6 ms. In other words, the filter uses samples from the echo array whose index corresponds to the estimate of the echo path delay less 6 ms. For example, if the estimate of the echo path delay is 311, then to get the difference between the index of the desired samples in the echo array and the index of the samples in the speech array, the estimate of the echo path delay is multiplied by 8 (there are 8 samples per ms) and then 48 is subtracted therefrom. Thus, in the example above, the index of the echo samples in the echo array should be 2440 greater than the index of the speech sample being used. The update coefficient used in the NLMS algorithm for the new filter is 0.002 divided by the average energy of the speech samples in the speech array.

The filter is converged for 4000 iterations of the NLMS algorithm. After 1000 iterations are completed, the each echo sample and the error the filter makes in predicting the echo power are separately squared and summed during each subsequent iteration to produce an echo power sum and an error power sum.

After the filter has converged for 4000 iterations, the ratio of error power sum to echo power sum is calculated, as shown in block 455. At block 460, if the ratio is greater than a predetermined amount, preferably 0.5, the filter is considered inadequately converged and the algorithm returns to the initial sample step of block 410 and starts over. If the ratio is less than the predetermined amount, the filter is considered to be adequately converged. A predetermined amount of 0.5 is preferred because that indicates that the filter is predicting 50% of the echo power.

If the filter is adequately converged, then, as shown in block 465, each of the taps of the filter is squared and the tap having the largest squared value is identified. This tap corresponds to the final echo path delay. In particular, the echo path delay equals the estimate of the echo path delay calculated above minus 6 ms plus the quotient of the index of the tap with the largest squared value divided by 8. For example, if the estimate of the echo path delay is 311 ms and the 85th tap in the filter has the largest squared value, then the final echo path delay equals (311−6)+(85÷8), or 315.625 ms.

Next, the present invention uses a frequency domain adaptive filter to make echo power measurements including echo path loss by converging a frequency domain adaptive filter using a NLMS algorithm. Convergence of frequency domain adaptive filters in this manner is well known in the art and is described in, for example, Earl R. Ferrara, Jr., *Frequency-Domain Adaptive Filtering*, in ADAPTIVE FILTERS 145 (C. F. N. Cowan and P. M. Grant eds., 1985) and Harish S. Punjabi et al., *A Modified μ-Weighted Normalized Frequency-Domain LMS Algorithm*, GLOBECOM, 1994, pgs. 232–236. A preferred manner of converging the frequency domain adaptive filter is described below.

As shown in block 470, a predetermined number of the consecutive samples of the full bandwidth speech data starting at the beginning of the speech array and a predetermined number of consecutive samples of the full bandwidth echo data delayed by the final echo path delay previously calculated are placed into separate preFFT arrays. In order to avoid circular convolution, each array is preferably padded with a predetermined number of consecutive zeros. In the preferred embodiment of the present invention, the predetermined number is equal to 128 and will thus be used for illustrative purposes herein.

As shown in block 472 and 473, the first 128 values in each of the preFFT arrays are squared and summed to estimate the speech and echo powers of the data. If the sum for the speech data is greater than 100,000 and also greater than the sum for the echo data, the algorithm proceeds to block 475. Otherwise, this data will not be used and the algorithm proceeds to block 500 to be described below.

Next, as shown in block 475, a fast Fourier transform, or FFT, is performed on each array of data in order to transfer from the time domain to the frequency domain. The real results of the FFTs are stored in a real speech FFT array and a real echo FFT array. The imaginary results of the FFTs are stored in an imaginary speech FFT array and an imaginary echo FFT array.

Then, as shown in block 480, for each of the 128 frequency bins produced by the FFTs, the real and imaginary echo values are squared and summed to estimate the echo power in each bin. This echo power value for each bin is divided by an average noise power of the transmission line which may be calculated as described in U.S. Pat. No 5,216,702, the specification of which has been previously incorporated herein by reference. The result of this division is an estimate of the ratio of the echo-to-noise power in each frequency bin. If this ratio is greater than 100, then the update coefficient for the NLMS algorithm is set to 0.1 for that frequency bin. If it is less than 100, then the update coefficient for that frequency bin is set to 0, so that the frequency domain adaptive filter tap for that frequency bin will not be updated. A value of 100 has been found to be optimal through empirical testing.

Next, a leaky integrator is used for each frequency bin to estimate the long term speech power in the bin. The leaky integrator multiplies its previous value by 0.9 and adds 0.1 times the sum of the squares of the real and imaginary speech values for the frequency bin to it, the result being an estimate of the average speech energy in each bin. This estimate of the average speech energy in each bin is used to normalize the update coefficient for the NLMS algorithm. The normalization is done by dividing the update coefficient for each frequency bin as determined above by the speech energy estimate for the bin. This new value replaces the update coefficient for the frequency bin.

Next, the magnitude of the real and imaginary taps of the frequency domain adaptive filter are multiplied by corresponding values in the real and imaginary speech FFT arrays to produce real and imaginary estimated echo values for each frequency bin of the filter. These estimated echo values are subtracted from corresponding values in the real and imaginary echo FFT arrays for each frequency bin to determine the amount of error made by the current taps of the frequency domain adaptive filter in each frequency bin. These real and imaginary error values for each frequency bin are then squared and added together. This value is multiplied by 0.05 and is added to 0.95 times an estimate of the current error power provided by a leaky integrator as described above. This new value provides an estimate of the current error power in each frequency bin.

Similarly, the real and imaginary echo values in the real and imaginary echo FFT arrays for each frequency bin are also squared and added together. This value is also multiplied by 0.05 and added to 0.95 times an estimate of the current echo power provided by a leaky integrator as described above. This new value provides an estimate of the current echo power in each frequency bin.

Next, referring to blocks 482-487, the ratio of the estimate of the current error power to the estimate of the current echo power for each bin is generated to identify how well the frequency domain adaptive filter has converged in each of the frequency bins. Each of these ratios for each frequency bin is compared to values holding the best ratio that has occurred for each frequency bin thus far. Note that, initially, each error-to-echo power ratio is set to 1.0. If the current ratio for any bin is less than the best ratio for that bin, then the current ratio is stored as the best ratio and the current real and imaginary tap values in that frequency bin are stored as the best tap values that have occurred. However, if the ratio of the error power to echo power in any frequency bin exceeds 1.0 or exceeds 1.5 times the best ratio for that bin, then the current real and imaginary tap values in that frequency bin are reset to the best values that were stored in memory multiplied by 0.8. Next, the NLMS algorithm is used to update the taps of the frequency domain adaptive filter in each frequency bin using the update coefficients generated as described above.

Next, as shown in block 500, if all of the unfiltered speech samples in the speech array have not been used, the algorithm moves to block 502 and places the next 128 unfiltered speech and echo samples from the speech and echo arrays into the preFFT arrays. From that point, the algorithm moves to block 472 and proceeds onward as described above. On the other hand, if all of the unfiltered speech samples have been used, the algorithm proceeds to block 505.

Referring to block 505, the algorithm identifies how well it has converged and determines if it has converged well enough to provide accurate echo power measurements. It does so by checking the best ratio determined as described above for each frequency bin.

If at least a predetermined number of bins, preferably 20, have a best ratio of less than a predetermined number, preferably 0.5, then convergence is considered to be satisfactory and the algorithm continues to the next step. If less than the predetermined number of bins have a ratio of less than the predetermined number, then the algorithm returns to the initial sampling step 410 and starts over. The index for each frequency bin that has a best ratio less than the predetermined number is stored in a frequency bin index array. In addition, the real and imaginary best tap values for each of the frequency bins are squared and added together. These values are stored in a separate array of good tap magnitudes.

Referring to block 515, if convergence is determined to be satisfactory, regression techniques are used to determine whether each of the bins that were determined to have best ratios less than the predetermined number have valid data. For each of these bins, a regression is run using the four bins closest to it whose indexes were also stored in the frequency bin index array. In particular, the indexes of these four bins and the tap magnitude of each of the four bins are used in a linear least squares regression. Linear least squares regression methods are well known in the art and will not be described herein. The linear least squares regression produces an equation for a line which is used to estimate what the tap magnitude for the frequency bin being checked should be. This estimation is done by plugging the index of the bin being checked into the equation just described. The output of the equation is the estimated tap magnitude for the bin being checked. This value is then divided by the actual tap magnitude for the frequency bin that has been stored in the array of good tap magnitudes described above. If this ratio is greater than 1.41 or less than 0.71, then it is determined that the bin has not converged well, and the best real and imaginary values for the filter in that frequency bin are set equal to 0 and the best ratio for the frequency bin is set equal to 1. The index of the frequency bin is then deleted from the frequency bin index array. If the ratio is between 0.71 and 1.41, then the bin is considered to have converged well and is referred to as a "good bin." The algorithm proceeds in this manner to check each frequency bin whose index has been stored in the frequency bin index array as just described.

Referring to block 520, all of the frequency bins whose indexes have been stored in the frequency bin index array have been checked as described above, the number of frequency bins whose index remains in the frequency bin index array is determined. In other words, the number of goods bins is determined. If this number is greater than 20, the algorithm moves on to the step shown in block 525.

Otherwise, the algorithm returns to the initial sampling step of block 410 and starts over.

As shown in block 525, the same regression technique described above is used to estimate the tap magnitudes for all frequency bins other than the good bins, that is all of those frequency bins other than those whose indexes are stored in the frequency bin index array. These bins are referred to as "missing bins." Specifically, for each missing bin, the four closest good bins are identified. The indexes and tap magnitudes of these four closest good bins are then used in a least square regression to produce an equation for a line. This equation is then used to find the estimated tap magnitudes of the missing bins by plugging the index for the missing bin into the equation and using the value output by the equation as the estimated tap magnitude for the missing bin. This is repeated for all of the missing bins.

Next, as shown in blocks 530 through 565, it is determined whether the frequency domain adaptive filter has converged well enough to measure the echo power in four different frequency bands. The first frequency band is echo path loss, or EPL, which covers a range of 200 to 3,400 Hz. The 7th through 109th frequency bins of the filter cover this frequency range. First, the number of good bins in this frequency range is determined. In addition, the largest gap between good bins is determined by subtracting the indexes of each consecutive good bin. If the number of good bins in this frequency range is 60 or more and is the largest gap between good bins is 20 or less, then convergence is considered to be good enough to generate an EPL measurement. This measurement is done by summing the tap magnitudes for all of the bins between the 7th and 109th frequency bins of the filter. This sum is then divided by 128 and the base 10 logarithm of the result is taken. After the base 10 logarithm is taken, the value is multiplied by −10 to arrive at the EPL measurement.

The second frequency band is echo return loss, or ERL, which covers a range of 500 to 2,000 Hz. The 17th through 64th frequency bins cover this frequency range. As was done with the EPL measurement, the good bins in this frequency range are counted and the largest gap between the good bins in that range is determined. If the number of good bins is 20 or more and if the largest gap is 20 or less, then convergence is considered to be good enough to generate an ERL measurement. This measurement is done by summing the tap magnitudes of all of the bins between the 17th and 54th frequency bins of the filter. This sum is then divided by 47 and the base 10 logarithm of the result is taken. After the base 10 logarithm is taken, the value is multiplied by −10 to arrive at the ERL measurement.

The third frequency band is singing return loss low, or SRLL, which covers a range of 200 to 500 Hz. The 7th through 17th frequency bins cover this frequency range. The good bins in this frequency range are counted and the largest gap between the good bins in that range is determined. If the number of good bins is 6 or more and if the largest gap between bins is 4 or less, then convergence is considered to be good enough to generate an SRLL measurement. This measurement is done by summing the tap magnitudes of all of the bins between the 7th and 17th frequency bins of the filter. This sum is then divided by 10 and the base 10 logarithm of the result is taken. Next, after the base 10 logarithm is taken, the value is multiplied by −10 to arrive at the SRLL measurement.

Finally, the fourth frequency band is singing return loss high, or SRLH, which covers a range of 2,000 to 3,400 Hz. The 69th through 109th frequency bins cover this frequency range. The good bins in this frequency range are counted and the largest gap between the good bins in that range is determined. If the number of good bins is 25 or more and if the largest gap between bins is 15 or less, then convergence is considered to be good enough to generate an SRLH measurement. This measurement is done by summing the tap magnitudes of all of the bins between the 69th and 109th bins of the filter. This sum is divided by 40 and the base 10 logarithm is taken. Next, after the base 10 logarithm is taken, the value is multiplied by −10 to arrive at the SRLH measurement.

As shown in block 570, if all four measurements are not made, the algorithm returns to block 410 to obtain new data leaving the frequency domain adaptive filter taps, the best taps and the ratios in their current state.

While presently preferred embodiments of the invention have been disclosed, it is to be understood that the invention is not limited thereto, but that many modifications will be apparent to those of skill in this art and are within the scope of the appended claims.

I claim:

1. A method of providing an echo power measurement of a transmission line having an echo path delay, comprising the steps of:

collecting a predetermined number of consecutive samples of a speech signal that is being transmitted on the transmission line and a predetermined number of consecutive samples of a signal that is simultaneously being received on the transmission line;

converting said speech signal samples and said received signal samples from a time domain to a frequency domain;

converging a frequency domain adaptive filter having a predetermined number of frequency bins having taps using predetermined ranges of said converted speech signal samples and corresponding ones of said converted received signal samples, said corresponding ones of said converted received signal samples being delayed in time by a value equal to said echo path delay;

determining whether a predetermined number of said frequency bins are accurately converged by determining whether said frequency bins satisfy a predetermined convergence criteria;

estimating a magnitude of said taps of said frequency bins that are not determined to be accurately converged using a regression method; and calculating the echo power measurement according to a predetermined formula using a magnitude of each of said taps of said accurately converged frequency bins and said estimated magnitudes.

2. A method according to claim 1, further comprising the step of determining whether said magnitudes of said taps of said accurately converged frequency bins are valid using a regression method.

3. A method according to claim 2, wherein said regression method is a linear least squares regression method.

4. A method according to claim 1, wherein said converging step is performed using a normalized least-mean-squares algorithm.

5. A method according to claim 4, wherein said normalized least-mean-squares algorithm utilizes an update coefficient for each frequency bin and wherein said update coefficients are determined using an echo-to-noise ratio of each frequency bin and an estimated average speech energy of each frequency bin.

6. A method according to claim 1, wherein said regression method is a linear least squares regression method.

7. A method according to claim 1, wherein said converting step utilizes a fast fourier transform.

8. A method according to claim 1, further comprising the step of confirming that said collected speech signal samples and said collected received signal samples are not double talk and are not an echo signal in a direction identical to a direction of said speech signal.

9. A method according to claim 1, wherein during said converging step a current ratio of error power to echo power of each of said frequency bins is calculated for each of said ranges of converted speech signal samples and a minimum of said current ratios is determined for each of said frequency bins and wherein said minimum current ratios are used during said determining step.

10. A method according to claim 9, wherein said predetermined convergence criteria comprises a determination of whether said minimum current ratios are less than a predetermined value.

11. A method according to claim 9, wherein a current magnitude of said taps of each of said frequency bins is determined for each of said ranges of converted speech signal samples and wherein the current magnitudes that correspond to said minimum current ratios are stored as optimal tap values.

12. A method according to claim 11, wherein said current magnitude of said taps of each of said frequency bins is set equal to 0.8 times a corresponding one of said optimal tap values if said current ratio of said frequency bin is greater than a predetermined value.

13. A method according to claim 12, wherein said predetermined value is the lesser of a second predetermined value and a predetermined percentage of said minimum current ratio of said frequency bin.

14. A method according to claim 11, wherein during said calculating step said magnitude of each of said taps of said accurately converged frequency bins comprises said optimal tap values.

15. A method according to claim 11, further comprising the step of determining whether said optimal tap values are valid using a regression method.

16. A method according to claim 1, wherein the echo power measurement comprises each path loss.

17. A method according to claim 1, wherein the echo power measurement comprises echo return loss.

18. A method according to claim 1, wherein the echo power measurement comprises singing return loss high.

19. A method according to claim 1, wherein the echo power measurement comprises singing return loss low.

20. A method according to claim 2, wherein only said magnitudes of said taps of said frequency bins determined to be valid are used in said calculating step.

21. A method according to claim 20, wherein said magnitudes of said taps of said accurately converged frequency bins determined to not be valid are discarded and wherein said estimating step further comprises estimating a magnitude of said taps of said accurately converged frequency bins determined to not be valid.

22. An apparatus for providing an echo power measurement of a transmission line having an echo path delay, comprising:

means for collecting a predetermined number of consecutive samples of a speech signal that is being transmitted on the transmission line and a predetermined number of consecutive samples of a signal that is simultaneously being received on the transmission line;

means for converting said speech signal samples and said received signal samples from a time domain to a frequency domain;

a frequency domain adaptive filter having a predetermined number of frequency bins having taps, said frequency domain adaptive filter being converged using predetermined ranges of said converted speech signal samples and corresponding ones of said converted received signal samples, said corresponding ones of said converted received signal samples being delayed in time by a value equal to said echo path delay;

means for determining whether a predetermined number of said frequency bins are accurately converged by determining whether said frequency bins satisfy a predetermined convergence criteria;

means for estimating a magnitude of said taps of said frequency bins that are not determined to be accurately converged using a regression method; and means for calculating the echo power measurement according to a predetermined formula using a magnitude of each of said taps of said accurately converged frequency bins and said estimated magnitudes.

23. An apparatus according to claim 22, further comprising means for determining whether said magnitudes of said taps of said accurately converged frequency bins are valid using a regression method.

24. An apparatus according to claim 23, wherein only said magnitudes of said taps of said frequency bins determined to be valid are used by said calculating means.

25. An apparatus according to claim 24, wherein said magnitudes of said taps of said accurately converged frequency bins determined to not be valid are discarded and wherein said estimating means estimates a magnitude of said taps of said accurately converged frequency bins determined to not be valid.

26. An apparatus according to claim 22, wherein said frequency domain adaptive filter is converged using a normalized least-mean-squares algorithm.

27. An apparatus according to claim 26, wherein said normalized least-means-squares algorithm utilizes an update coefficient for each frequency bin and wherein said update coefficients are determined using an echo-to-noise ratio of each frequency bin and an estimated average speech energy of each frequency bin.

28. An apparatus according to claim 22, wherein during said convergence a current ratio of error power to echo power of each of said frequency basis is calculated for each of said ranges of converted speech signal samples and a minimum of said current ratios is determined for each of said frequency bins and wherein said minimum current ratios are used by said determining means.

29. An apparatus according to claim 28, wherein said predetermined convergence criteria comprises whether said minimum current ratios are less than a predetermined value.

30. A method of measuring an echo path delay of a transmission line, comprising the steps of:

collecting a predetermined number of consecutive samples of a speech signal that is being transmitted on the transmission line and a predetermined number of consecutive samples of a signal that is simultaneously being received on the transmission line;

subband filtering said speech signal samples and said received signal samples;

converging a predetermined number of first time domain adaptive filters having taps for a predetermined number of iterations using said subband filtered speech signal samples and corresponding ones of said subband filtered received signal samples, each of said first time domain adaptive filters covering a predetermined time period;

determining which of said first time domain adaptive filters has converged most accurately as measured by a predetermined criteria and identifying which of said taps of said most accurately converged filter has a largest power, wherein said tap having said largest power corresponds to a first time value;

converging a second time domain adaptive filter having taps for a predetermined number of iterations using said collected speech signal samples and corresponding ones of said collected received signal samples, said corresponding ones of said collected received signal samples being delayed in time by said first time value;

identifying which of said taps of said second time domain adaptive filter has a largest power, wherein said tap having said largest power corresponds to a second time value; and calculating said echo path delay according to a predetermined formula using said second time value.

31. A method according to claim 30, further comprising the step of confirming that said collected speech signal samples and said collected received signal samples are not double talk and are not an echo signal in a direction identical to a direction of said speech signal.

32. A method according to claim 30, wherein during said step of converging said first time domain adaptive filters a ratio of a sum of error power to a sum of echo power is calculated for each of said first time domain adaptive filters and wherein a minimum of said ratios is used during said determining step to identify said most accurately converged time domain adaptive filter.

33. A method according to claim 30, further comprising the step of calculating a ratio of a sum of error power to a sum of echo power for said second time domain adaptive filter and wherein said method proceeds to said identifying step only if said ratio satisfies a predetermined condition.

34. A method according to claim 33, wherein said predetermined condition comprises said ratio being less than 0.5.

35. A method according to claim 30, wherein said converging steps are performed using a normalized least-mean-squares algorithm.

36. A method according to claim 30, wherein said normalized least-mean-squares algorithm utilizes an update coefficient and wherein, for said step of converging said first time domain adaptive filters, said update coefficient is normalized using an average energy of said subband filtered speech signal samples.

37. A method according to claim 30, wherein said corresponding ones of said subband filtered received signal samples for a particular one of said first time domain adaptive filters are delayed in time with respect to said subband filtered speech signal samples by an amount equal to a beginning time of said time period covered by said particular one of said first time domain adaptive filters.

38. An apparatus for measuring an echo path delay of a transmission line, comprising:

means for collecting a predetermined number of consecutive samples of a speech signal that is being transmitted on the transmission line and a predetermined number of consecutive samples of a signal that is simultaneously being received on the transmission line;

means for subband filtering said speech signal samples and said received signal samples;

a predetermined number of first time domain adaptive filters having taps, each of said first time domain adaptive filters covering a predetermined time period, said first time domain adaptive filters being converged for a predetermined number of iterations using said subband filtered speech signal samples and corresponding ones of said subband filtered received signal samples;

means for determining which of said first time domain adaptive filters has converged most accurately as measured by a predetermined criteria and means for identifying which of said taps of said most accurately converged filter has a largest power, wherein said tap having said largest power corresponds to a first time value;

a second time domain adaptive filter having taps, said second time domain adaptive filter being converged for a predetermined number of iterations using said collected speech signal samples and corresponding ones of said collected received signal samples, said corresponding ones of said collected received signal samples being delayed in time by said first time value;

means for identifying which of said taps of said second time domain adaptive filter has a largest power, wherein said tap having said largest power corresponds to a second time value; and means for calculating said echo path delay according to a predetermined formula using said second time value.

39. An apparatus according to claim 38, wherein during said convergence of said first time domain adaptive filters a ratio of a sum of error power to a sum of echo power is calculated for each of said first time domain adaptive filters and wherein a minimum of said ratios is used by said determining means to identify said most accurately converged time domain adaptive filter.

40. An apparatus according to claim 38, wherein said first time domain adaptive filters and said second time domain adaptive filter are converged using a normalized least-mean-squares algorithm.

41. An apparatus according to claim 40, wherein said normalized least-mean-squares algorithm utilizes an update coefficient and wherein, for said convergence of said first time domain adaptive filters, said update coefficient is normalized using an average energy of said subband filtered speech signal samples.

42. An apparatus according to claim 38, wherein said corresponding ones of said subband filtered received signal samples for a particular one of said first time domain adaptive filters are delayed in time with respect to said subband filtered speech signal samples by an amount equal to a beginning time of said time period covered by said particular one of said first time domain adaptive filters.

* * * * *